United States Patent [19]
Kawano et al.

[11] Patent Number: 5,506,603
[45] Date of Patent: Apr. 9, 1996

[54] METHOD AND DEVICE FOR AIRBRUSHING

[75] Inventors: Michiko Kawano; Taeko Koizumi, both of Kawasaki, Japan

[73] Assignee: Fujitsu Ltd., Kawasaki, Japan

[21] Appl. No.: 202,560

[22] Filed: Feb. 28, 1994

[30] Foreign Application Priority Data

May 19, 1993 [JP] Japan ................................ 5-117360

[51] Int. Cl.⁶ .............................. G09G 1/28; G09G 5/02
[52] U.S. Cl. .......................................... 345/154; 345/179
[58] Field of Search .................................. 345/153, 154, 345/156, 179

[56] References Cited

U.S. PATENT DOCUMENTS

| | | | |
|---|---|---|---|
| 4,775,858 | 10/1988 | Stapleton et al. | 345/179 |
| 4,829,455 | 5/1989 | Long et al. | 345/154 |
| 5,225,817 | 6/1993 | Long | 345/153 |

*Primary Examiner*—Jeffery Brier
*Attorney, Agent, or Firm*—Staas & Halsey

[57] ABSTRACT

A method for airbrushing and a device therefor enable to perform an airbrush operation in which only lightness or chroma is varied. The airbrush device performs the airbrush operation to gradate a designated region or regions of RGB data by converting the RGB data in a RGB coordinate system into image data in a lightness, chroma and/or hue coordinate system, and designating airbrush information for performing the airbrush operation on the converted image data in the lightness, chroma and/or hue coordinate system. Image data corresponding to the airbrush information is extracted from the converted image data in the lightness, chroma and/or hue coordinate system, and the airbrush operation is performed on the extracted image data in the lightness, chroma and/or hue coordinate system based on the airbrush information.

20 Claims, 13 Drawing Sheets

※ BRUSH CURVE α=f(s)

⇐ AN EXAMPLE OF BRUSH CURVE

HUMAN PSYCHOPHYSICAL QUANTITY

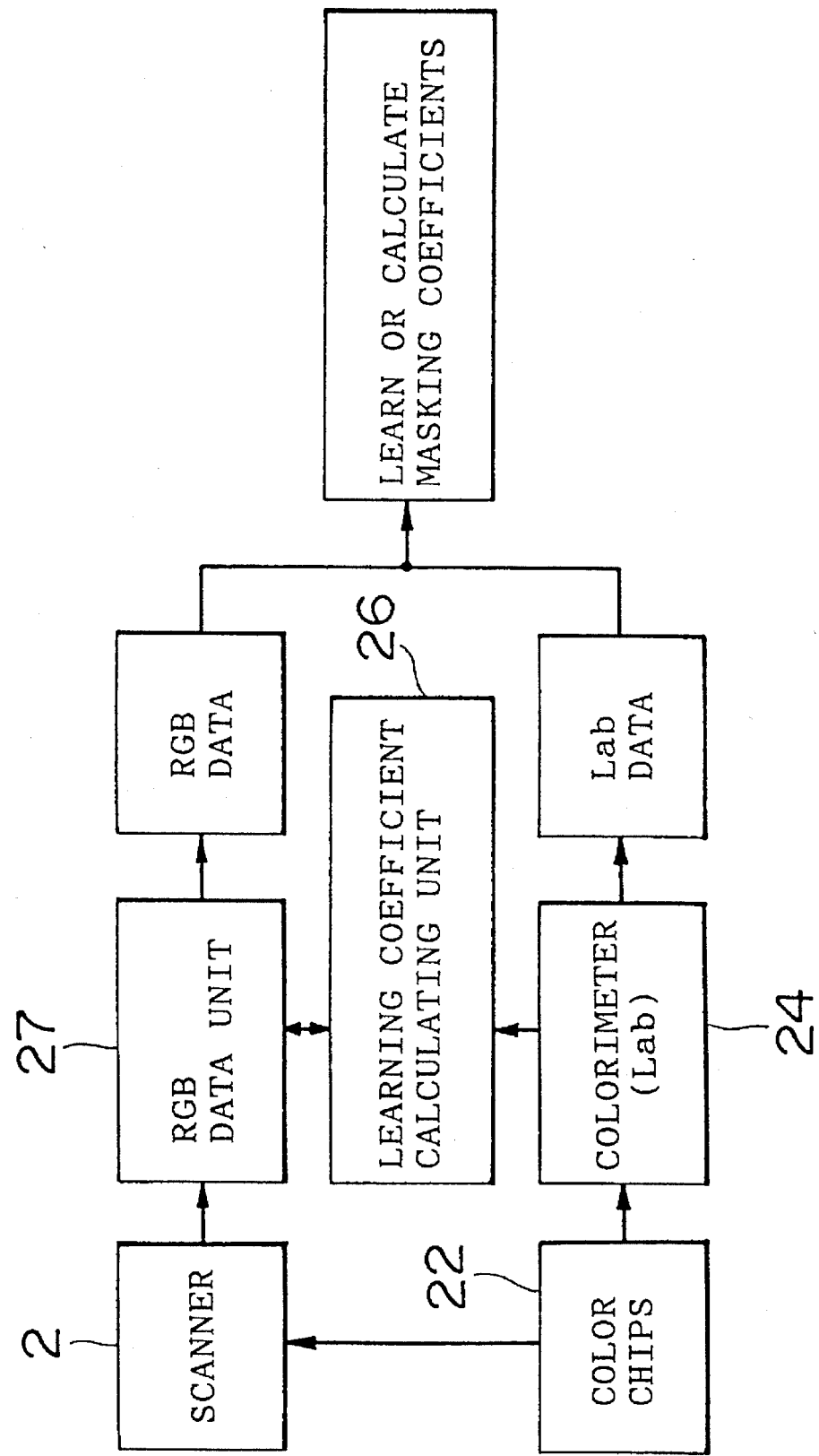

FIG.13(a) (PRIOR ART)
ATTENTION TO THIS LINE →
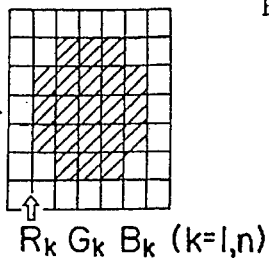
$R_k G_k B_k$ (k=1,n)
FIG.13(b)1 (PRIOR ART)
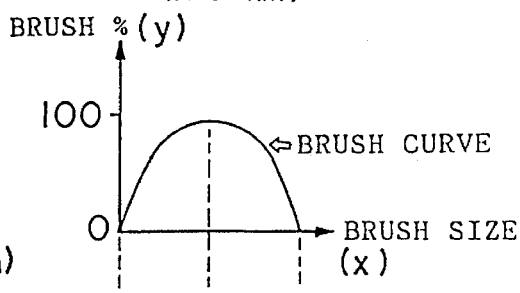
FIG.13(b)2 (PRIOR ART)
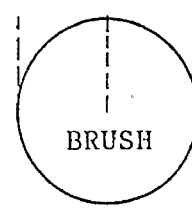
BRUSH
FIG.13(c) (PRIOR ART)
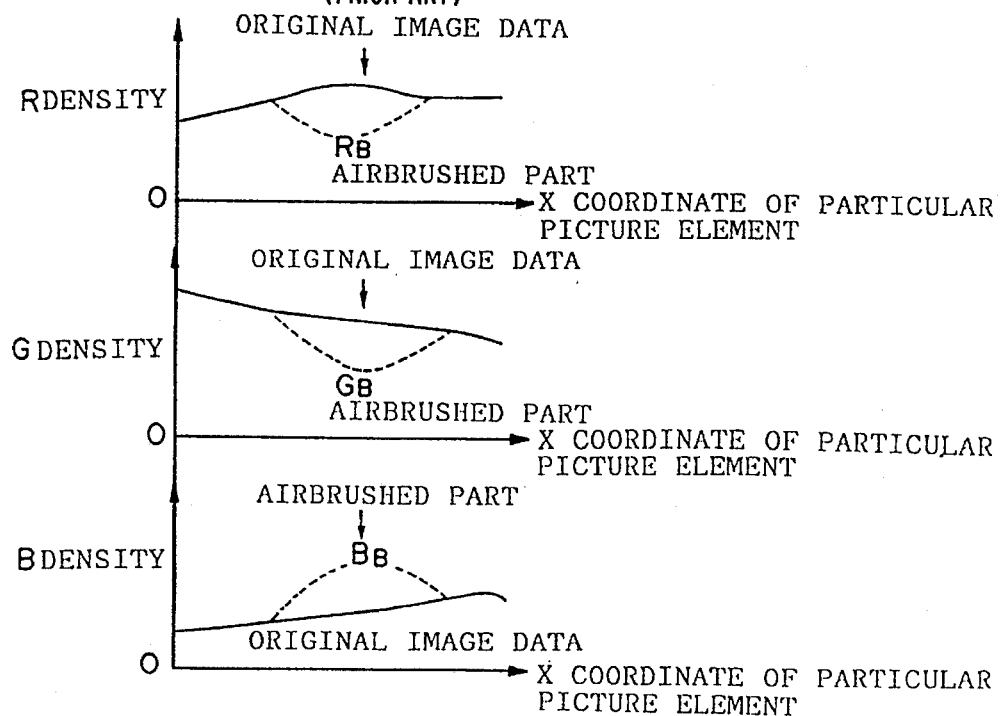

EFFECTS OF BRUSHING IN VIEW OF HUMAN EYES

METHOD AND DEVICE FOR AIRBRUSHING

BACKGROUND OF THE INVENTION (1) Field of the Invention

The present invention relates to a color image processing unit for processing images such as color photographs and color pictures and, more particularly, to a method for airbrushing in order to gradate a designated region or regions of color image data and a device therefor.

(2) Description of the Related Art

In recent years, color image processing units for handling color images by means of a computer have been developed in order to answer the growing demand for colored printing in the field of printing, newspaper and design industries. One technique of image processing which is used in conjunction with color processing units is known as "airbrush". Airbrush is a process to gradate a designated region or regions of image data as if color was sprayed on the image data. Airbrush is utilized for a variety of operations such as, for example, connecting two or more images together or superposing letters on an airbrushed region of an image.

In the prior art, airbrush operations have been commonly performed on the color image data which were represented in the RGB coordinate system or in the YMC coordinate system. A conventional method for airbrushing of this kind is shown in FIGS. 13(a), 13(b) and 13 (c).

First, an airbrush operation is performed on image data $R_k G_k B_k$ (k=1, n) in an airbrush effective region of RGB data which is input through a scanner by means of brush colors (RGB) and brush sizes, as designated by an operator (see FIG. 13(a)). The RGB data is airbrushed at a designated brush % of a predetermined designated brush curve as shown in FIG. 13(b).

Then, $R'_k G'_k B'_k$ (k=1, n), as a result of the above airbrushing at a designated brush %, is calculated. Density of the RGB data, as a result of the airbrushing, is illustrated along a particular line in the direction of the X-axis in FIG. 13(c). The result of the airbrush operation is expressed in dotted lines.

However, the conventional airbrush process performed in the RGB space or YMC space often causes, in part, a sudden change of brightness or a shift of color even when the brush % is decreased linearly from the center of the brush towards the brush frames as shown in FIG. 14(a). This is because the brush %, in view of human eyes, decreases non-linearly from the center of the brush towards the brush frames as shown in FIG. 14(b). In other words, the RGB space does not correspond to human senses. Accordingly, it was necessary to draw a brush curve as shown in FIG. 14(c) so that the brush % in view of human eyes forms a brush curve as shown in FIG. 14(a). Hence the operator's job was made very difficult and troublesome.

Further, in the RGB or YMC space, even if attempts are made to vary lightness (brightness) and vividness or chroma, variations of R, G, B (Y, M, C) do not correspond to lightness and chroma. It is thus necessary for each color to seek different brush colors with different lightness and/or chroma prior to the processing, thereby making the operations more difficult and complicated.

The present invention responds to the aforesaid problems, and its purpose is to provide a method for airbrushing and a device therefor, which enable an operator to perform an airbrush operation without a need to adjust a brush curve, and also to perform an airbrush operation in which only lightness or chroma is varied.

SUMMARY OF THE INVENTION

In order to dissolve the above problems and achieve the aforesaid and other purposes, the present invention has the constitution as described hereunder. In an airbrush device according to the invention, a space of lightness, chroma and/or hue is used as a color space for image data and brush data.

More particularly, this airbrush device is designed to achieve an airbrushing operation in order to gradate a designated region or regions of RGB data and comprises a converting means, a designating means, an extracting means and a processing means.

The converting means converts the RGB data in said RGB coordinate system into image data in the lightness, chroma and/or hue coordinate system. The designating means designates airbrush information for carrying out an airbrush operation on the image data in the lightness, chroma and/or hue coordinate system converted by the converting means.

The extracting means extracts image data corresponding to said airbrush information from the image data in the lightness, chroma and/or hue coordinate system converted by the converting means. Based on the airbrush information, the processing means performs an airbrush operation on the image data in the lightness, chroma and/or hue coordinate system extracted by the extracting means.

A method for airbrushing according to the present invention is intended to perform an airbrushing operation in order to gradate a designated region or regions of RGB data, including the steps of:

converting the RGB data in said RGB coordinate system into image data in the lightness, chroma and/or hue coordinate system (conversion step);

designating airbrush information for performing an airbrush operation on the converted image data in the lightness, chroma and/or hue coordinate system (designation step);

extracting image data corresponding to said airbrush information from the converted image data in the lightness, chroma and/or hue coordinate system (extraction step); and performing an airbrush operation on the image data in the lightness, chroma and/or hue coordinate system extracted based on the airbrush information (processing step).

The converting means may be a Lab color converting unit which converts said RGB data into image data in the Lab coordinate system consisting of lightness L and ab representing chroma and hue, or may be a Luv color converting unit which converts the RGB data into image data in the Luv coordinate system consisting of lightness L and uv representing chroma and hue. Alternatively, the converting means may be a HVC color converting unit which converts the RGB data into image data in the HVC coordinate system comprising hue H, value V and chroma C.

The converting means may also comprise a camera or pick-up means to obtain the RGB data by picking up images of color chips; a colorimeter to obtain image data in the lightness, chroma and/or hue coordinate system by observing colors of the color chips; and a learning means to perform said conversion by learning data of correspondence between the RGB data and the image data in the lightness, chroma and/or hue coordinate system.

The designating means may designate airbrush information including airbrush size, position of airbrushing, brush color, and brush curve. The extracting means may preferably extract image data in the lightness, chroma and/or hue system corresponding to said airbrush information concerning brush size and position of airbrushing from the data in the lightness, chroma and/or hue system.

The processing unit may be designed to obtain airbrushed image data by executing operations on the image data in the lightness, chroma and/or hue system extracted by the extracting means with the airbrush information concerning brush color and brush curve.

Also the airbrush device may be provided with a first color converting unit which converts said data in the lightness, chroma and/or hue coordinate system into RGB data, and a displaying unit which displays the RGB data converted by the color converting unit. It may also be provided with a second color converting unit which converts the data in the lightness, chroma and/or hue coordinate system into cyan-magenta-yellow data, and a printer which prints the cyan-magenta-yellow data converted by the color converting unit.

According to the present invention, the RGB data is converted into image data in the lightness, chroma and/or hue coordinate system, and airbrush information is designated in order to perform an airbrush operation on the converted image data in the lightness, chroma and/or hue coordinate system.

Then, image data corresponding to said airbrush information is extracted from the converted image data in the lightness, chroma and/or hue coordinate system, and an airbrush operation is performed on the image data in the lightness, chroma and/or hue coordinate system extracted based on the airbrush information.

Thus, the present invention uses image data in the lightness, chroma and/or hue coordinate system which matches human visual senses, thereby preventing undesirable sudden changes of color and enabling effective performance of more natural airbrush. And, due to the use of image data in the lightness, chroma and/or hue coordinate system and based on the airbrush information including lightness, chroma and/or hue, it becomes possible to perform airbrush operations which may differentiate from the original image with respect to its lightness, chroma and/or hue, thereby enabling more effective performance of image processing.

BRIEF DESCRIPTION OF THE DRAWINGS

The invention will now be described by way of examples, with reference to the drawings, in which

FIG. 12 is a block diagram illustrating the structure of an airbrush device of a forth embodiment;

FIG. 13(a) (PRIOR ART) illustrates an example of a conventional method for airbrushing;

FIG. 13(b) (PRIOR ART) illustrates the brush curve;

FIG. 13(b)2 (PRIOR ART) illustrates a brush corresponding to the brush curve of FIG. 13(b)1;

FIG. 13(c) (PRIOR ART) illustrates the result of airbrushing; and

DETAILED DESCRIPTION OF THE EMBODIMENTS

Figure 1:
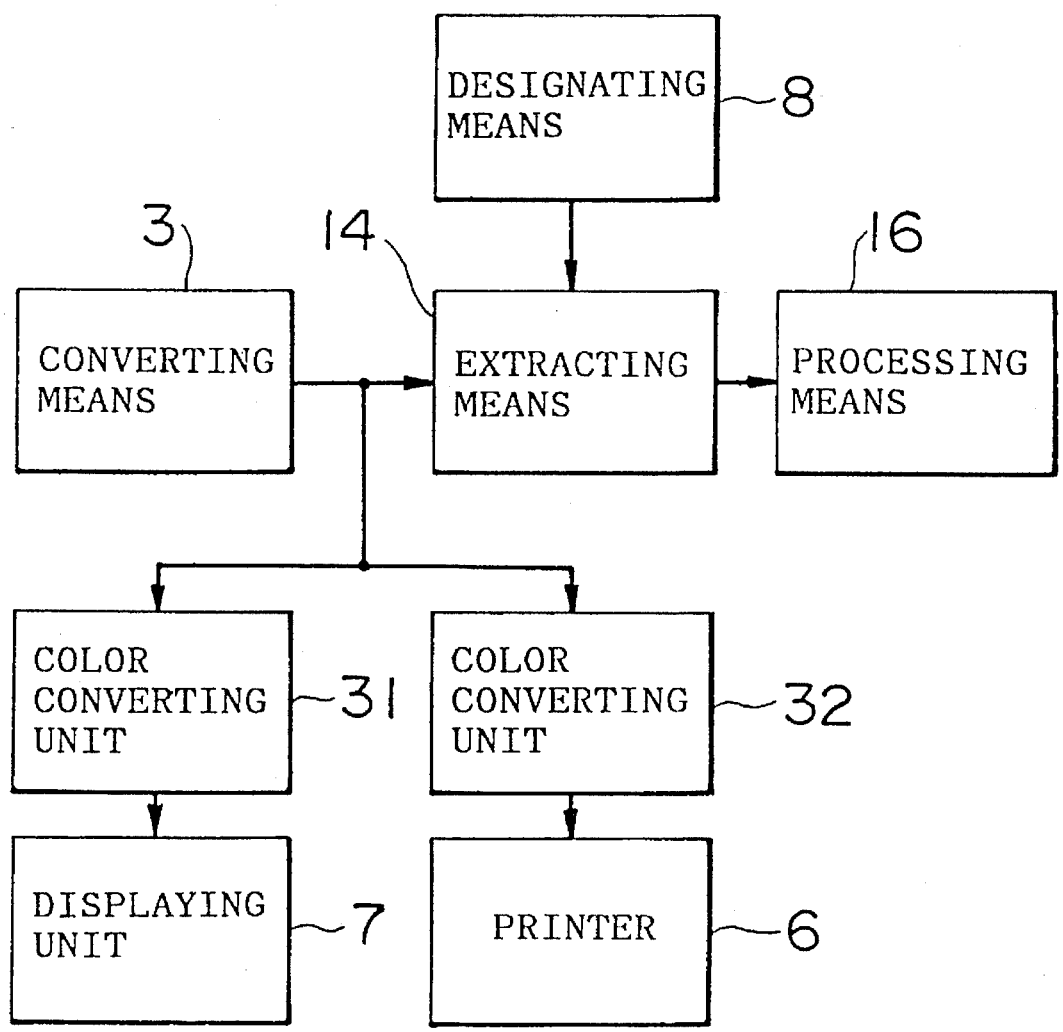
FIG. 1 is a block diagram illustrating the basic structure of an airbrush device in accordance with the invention.
Figure 2:
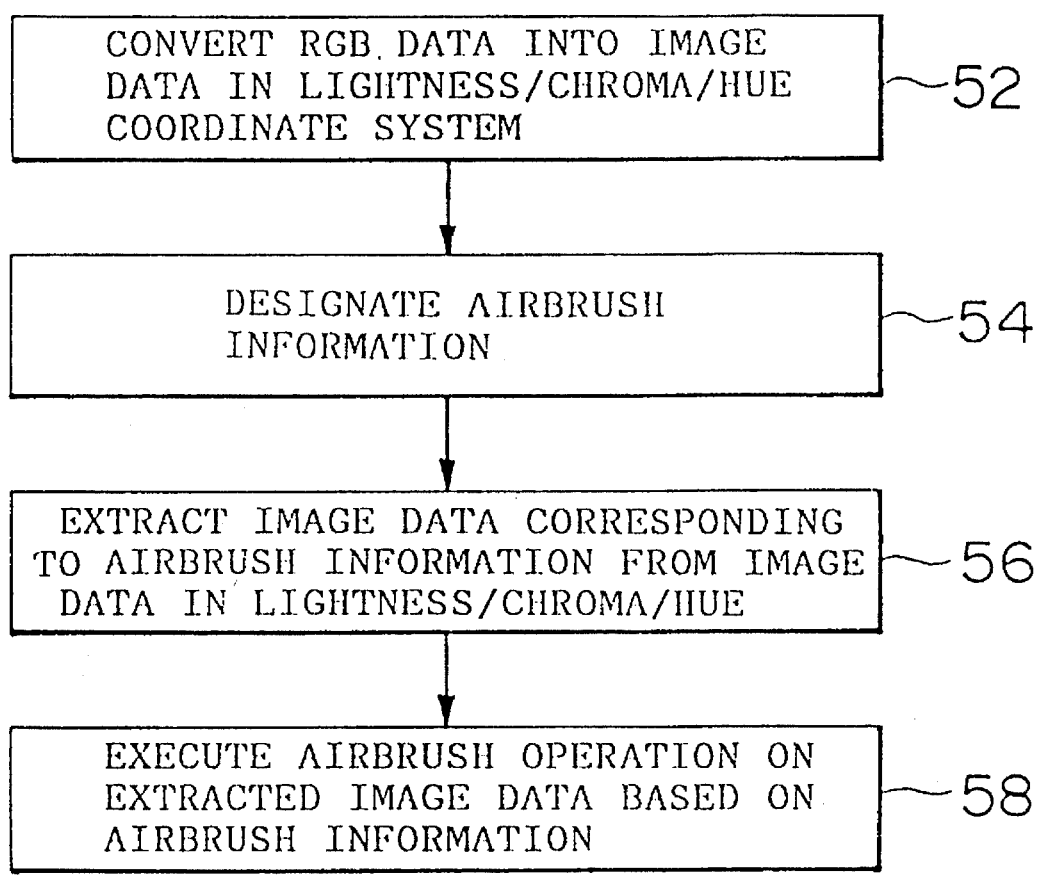
FIG. 2 is a flow chart illustrating the principle of a method for airbrushing in accordance with the invention.

FIG. 1 is a block diagram showing the basic structure of the airbrush device. FIG. 2 is a flow chart showing the principle of the method for airbrushing. FIGS. 3, 8, 10 and 12 show the concrete embodiments according to the basic structure of above airbrushing principle.

In the FIG. 1, the airbrush device comprises a converting means 3, a designating means 8, an extracting means 14 and a processing means 16.

In the FIG. 2, the method of the present invention comprises the steps of a converting step 52, a designating step 54, an extracting step 56 and a processing step 58 so as to gradate a designated region or regions of RGB data.
Embodiment 1

Figure 3:
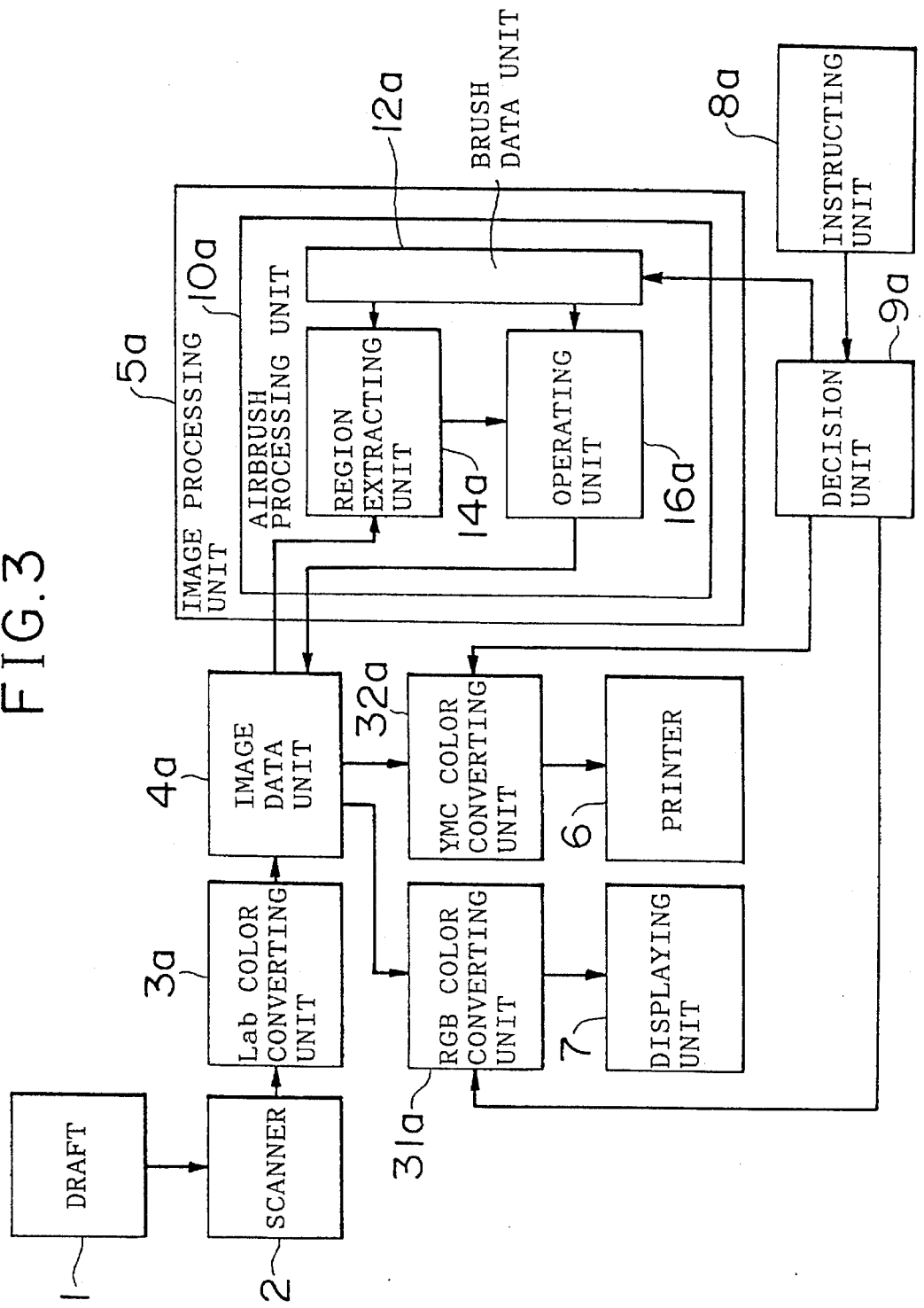
FIG. 3 is a block diagram illustrating the structure of an airbrush device of a first embodiment.

FIG. 3 is a functional block diagram showing an airbrush device of the first embodiment which utilizes the method for airbrushing of the present invention.

Referring to FIG. 3, a scanner 2 may be a color image scanner which picks up an image of a draft 1 to obtain RGB data as its image data. The scanner 2 is connected with a Lab color converting unit 3a.

The Lab color converting unit 3a is provided between the scanner 2 and an image data unit 4a to convert the RGB data from the scanner 2 into a color space on the image data unit 4a. The color space of the image data unit 4a may be a uniform color space which is generally considered most suitable to human perception or the visual senses. For the uniform color space a Lab space is used. The color data unit 4a is connected with an image processing unit 5a, a RGB color converting unit 31a, and a YMC color converting unit 32a.

The YMC color converting unit 32a has a function to convert image data from the image data unit 4a into YMC data which is suitable for printing by a printer 6. The RGB color converting unit 31a can convert the image data from the image data unit 4a into RGB data which is suitable for display by a displaying unit 7.

An image processing unit 5a, for processing the image data supplied from the image data unit 4a, has an airbrush processing unit 10a to perform airbrush operations on the image data supplied from the image data unit 4a. This airbrush processing unit 10a is connected with a decision unit 9a which is connected to an instructing unit 8a.

The instructing unit 8a which may be an input device such as a keyboard or a mouse issues various instructions to direct the decision unit 9a to perform airbrushing, displaying or printing operations. The decision unit 9a judges an instruction from the instructing unit 8a, and responding thereto, activates either a brush data unit 12a, the RGB color converting unit 31a or the displaying unit 7.

The brush data unit 12a inputs airbrush information such as the size of the airbrush and the position of the airbrushing which is given by the operator through the instructing unit 8a. The brush data unit 12a is connected with a region extracting unit 14a.

The region extracting unit 14a extracts a region from the image data (Lab) stored in the image data unit 4a to correspond with the airbrush information which is read out from the brush data unit 12a. The region extracting unit 14a is connected to an operating unit 16a.

The operating unit 16a operates on the extracted image data with the brush % supplied from the brush data unit 12a and with designated brush colors, so as to produce brushed image data.

Processing in Embodiment

The method for airbrushing to be performed by means of the device according to the embodiment 1 will be described below.

Figure 4:
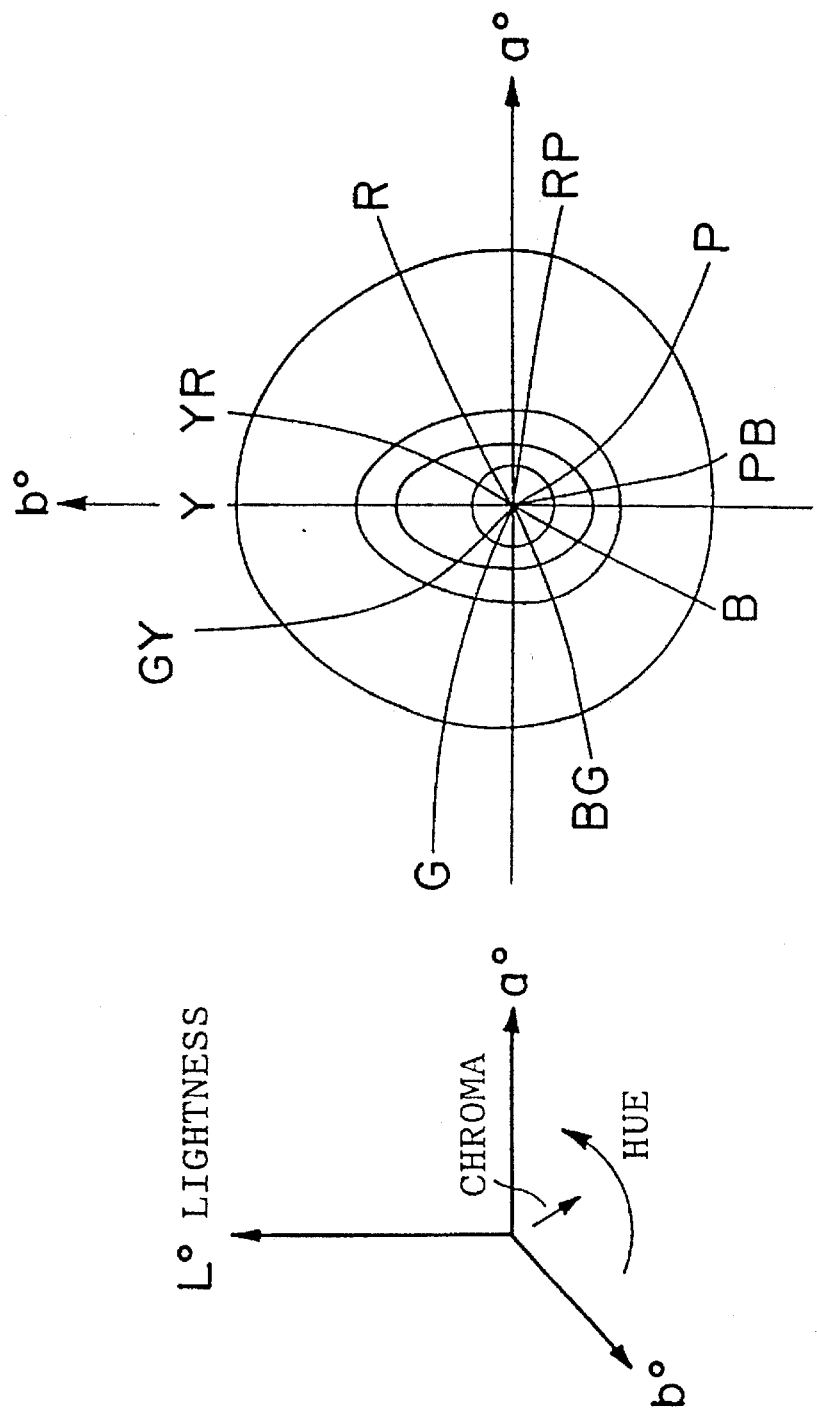
FIG. 4(a) illustrates the L*a*b* coordinate system respectively.
FIG. 4(b) illustrates the detail of hue.
Figure 5:
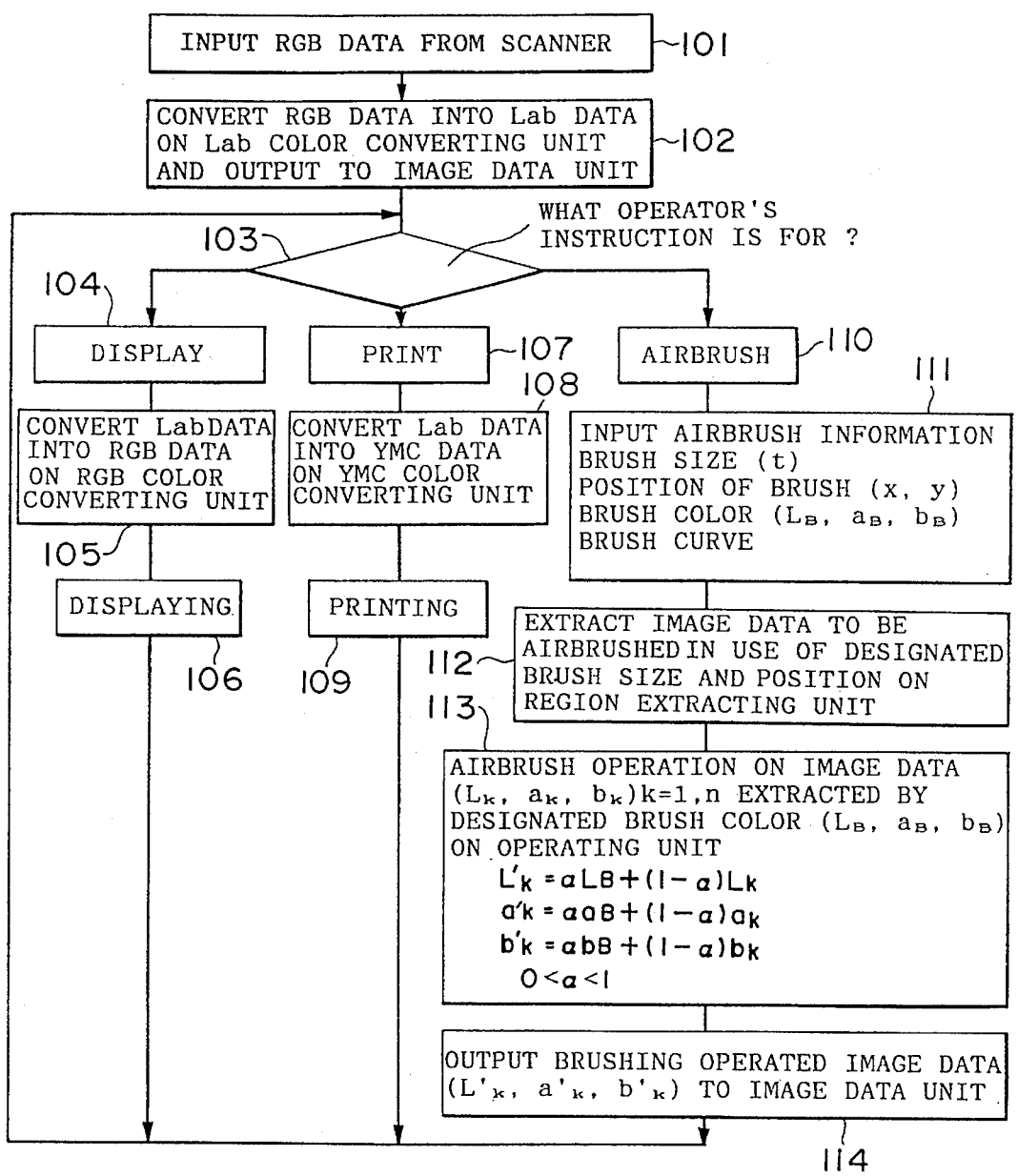
FIG. 5 is a flow chart illustrating the process of a method for airbrushing according to the first embodiment.

FIG. 5 is a flow chart of the method for airbrushing of the embodiment 1. The airbrush operation in the embodiment 1 uses a lightness-chroma-hue space and a L*a*b* coordinate system. This L*a*b* coordinate system is shown in FIG. 4, where lightness is expressed in the L* axis and hue is in the a*b* axes. The, details of said hue is shown in FIG. 4(b) in which, for example, the reference GY represents greenyellow.

First, the scanner 2 picks up and analyses an image of the draft 1 into RGB data (step 101), the Lab color converting unit 3a converts the RGB data into Lab data by coordinate transformation from the RGB coordinate system to the L*a*b* coordinate system, and outputs the Lab data to the image data unit 4a (step 102).

Here, the coordinate transformation from the RGB coordinate system to the L*a*b* coordinate system can be written in the following equations. First, the RGB coordinates are transformed to the XYZ coordinates.

$X = 0.608R + 0.174G + 0.200B$ $Y = 0.299R + 0.587G + 0.114B$ $Z = 0 + 0.066G + 1.112B$

And then, the XYZ coordinates are transformed to the L*a*b* coordinates.

$X_0 = 98,072$ $Y_0 = 100.0$ $Z_0 = 118,225$

When $X/X_0 > 0.008856$, $xt = (X/X_0)^{1/3}$;

when $X/X_0 < 0.008856$, $xt = 7.787 X/X_0 + 16/116$;

when $Y/Y_0 > 0.008856$, $yt = (Y/Y_0)^{1/3}$;

when $Y/Y_0 < 0.008856$, $yt = 7.787 Y/Y_0 + 16/116$;

when $Z/Z_0 > 0.008856$, $zt = (Z/Z_0)^{1/3}$;

when $Z/Z_0 < 0.008856$, $zt = 7.787 Z/Z_0 + 16/116$.

$L^* = 116y - 16$ $a^* = 500(xt - yt)$ $b^* = 200(yt - zt)$

Then, if the operator gives an instruction through the instruction unit 8a to the decision unit 9a to carry out either displaying, printing or airbrushing operations, the decision unit 9a judges and determines the contents of the instruction (step 103).

For example, if the instruction given by the operator through the instruction unit 8a directs the decision unit 9a to perform a displaying operation (step 104), the decision unit 9a will activate the RGB color converting unit 31a. Then, the L*a*b* data is converted into RGB data by the RGB color converting unit 31a (step 105), and the RGB data is displayed on the displaying unit 7 (step 106).

Alternatively, if the operator gives an instruction through the instruction unit 8a to perform a printing operation (step 107), the decision unit 9a will activate the YMC color converting unit 32a. Then, the L*a*b* data is converted into YMC data on the YMC color converting unit 32a (step 108), and the YMC data is output to the printer 6 (step 109).

The processing from the step 107 to the step 109 can be performed prior to the processing from the step 104 to the step 106.

Next, the operator gives an instruction necessary for image processing on the image data being displayed on the displaying unit 7. The airbrush processing unit 10a conducts airbrushing as one operation of the image processing in the L*a*b* space (step 110).

The airbrush data unit 12a inputs the airbrush information which is given by the operator through the instruction unit 8a (step 111). The airbrush information consists of, for example, size (t) of airbrush, position (x, y) of airbrushing, brush color ($L_B$, $a_B$, $b_B$), brush curve ($\alpha = f(s)$, or table information in which coordinate information concerning several points on a locus of the brush curve is stored).

Figure 6A:
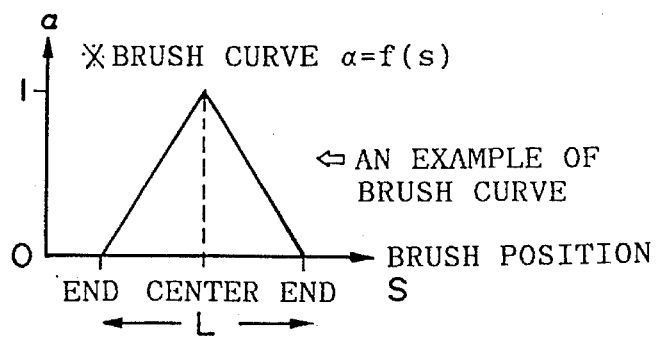
FIGS. 6(a) and 6(b) illustrate characteristics of brushing of the first embodiment.
Figure 6B:
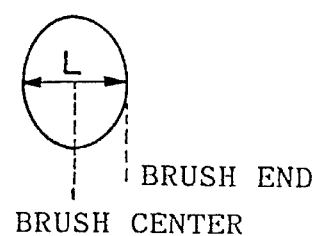

One example of the brush curve is shown in FIG. 6. The brush curve $\alpha = f(s)$ shown in FIG. 6(a) has a peak brush % at the center and therefrom the brush % decreases toward both ends. Brush size (t) is shown in FIG. 6(b).

Next, the region extracting unit 14a extracts suitable image data corresponding to the information concerning position and size of brush, from the image data stored in the image data unit 4a (step 112).

And, the operation unit 14 performs an operation on the corresponding image data $L_k a_k b_k$ (k=1, n) with the brush % of the brush curve being supplied from the brush data unit 12a and the designated brush color ($L_B a_B b_B$), so that airbrushed image data $L_k' a_k' b_k'$ (k=1, n) is calculated by means of the following equations (step 113).

$L_k' = \alpha L_B + (1-\alpha) L_k$ $a_k' = \alpha a_B + (1-\alpha) a_k$ $b_k' = \alpha b_B + (1-\alpha) b_k$, $0 < 60 < 1$ And, the airbrushed image data $L_k' a_k' b_k'$ is output to the image data unit 4a (step 114). Upon completion of the operation at the step 114, processing may return to the step 103.

Further, the processed image can be confirmed by means of the displaying unit 7 or the printer 6.

In the present invention, the image data and the brush data in the L*a*b* coordinate system make it possible to achieve brushing operations in which only lightness or chroma can be varied, though such brushing could not have been realized with RGB data in the prior art.

In the L*a*b* coordinate system, for example, if an instruction of lightness $L_0$ is given by the operator, the subsequent brushing operation performed only on the image data Lk will result in an airbrushed image in which only lightness is varied in relation to the original image.

If an instruction is given to execute a brushing operation with chromaticness $T_0 = (a_0^2 + b_0^2)^{1/2}$, the image data ak, bk are used to obtain chromaticness $T_k = (a_k^2 + b_k^2)^{1/2}$, so that airbrushing can be performed without changing hue of the image.

Figure 6C:
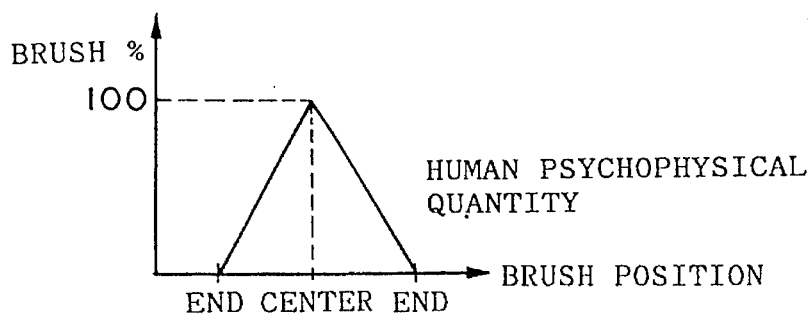
FIG. 6(c) illustrates the brush size.

Also, use of a Lab space in the present invention may have the effects of brushing as shown in FIG. 6(c). The characteristics of brushing shown in FIG. 6(c) are the same with that shown in FIG. 6(a), and correspond to a human psychophysical quantity.

Figure 7:
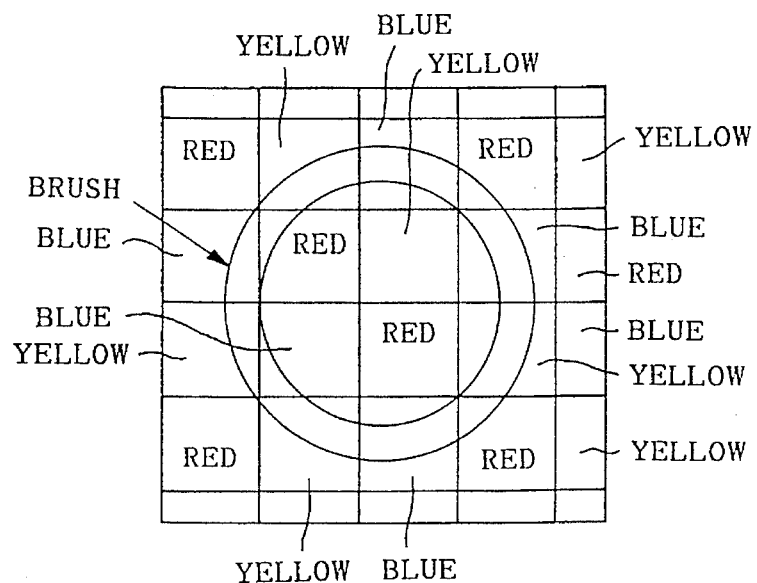
FIG. 7 illustrates an example of the airbrush in which lightness is varied.

In the prior art where a RGB space is used, when it is required to perform an airbrush operation such that lightness is varied in the form of matrix as shown in FIG. 7, first, colors $(R_{r0}G_{r0}B_{r0})$, $(R_{b0}G_{b0}B_{b0})$, $(R_{y0}G_{y0}B_{y0})$ are obtained by changing lightness of colors of red $(R_rG_rB_r)$, blue $(R_bG_bB_b)$, and yellow $(R_yG_yB_y)$, and then airbrushing is performed with the colors obtained in the first step on a brush region and a region which is partitioned out of the color region of the image data.

In this example where the image is partitioned by a single color, airbrush operations are possible while requiring long hours for completing the operations. However, if an image has different density for each picture element such as photographs, RGB must be determined for each picture element, so that airbrush operations are virtually impossible.

On the contrary, the L*a*b* space of the embodiment 1 has an element L* which represents lightness, so that use of a designated L and Lk (k=1, n) of the image data on which brushing operation can be effectively performed makes it possible to execute airbrushing only with respect to lightness. Thus, there is no difficulty in performing airbrush operations on even an image having different density for each picture element such as photographs.

Embodiment 2

Figure 8:
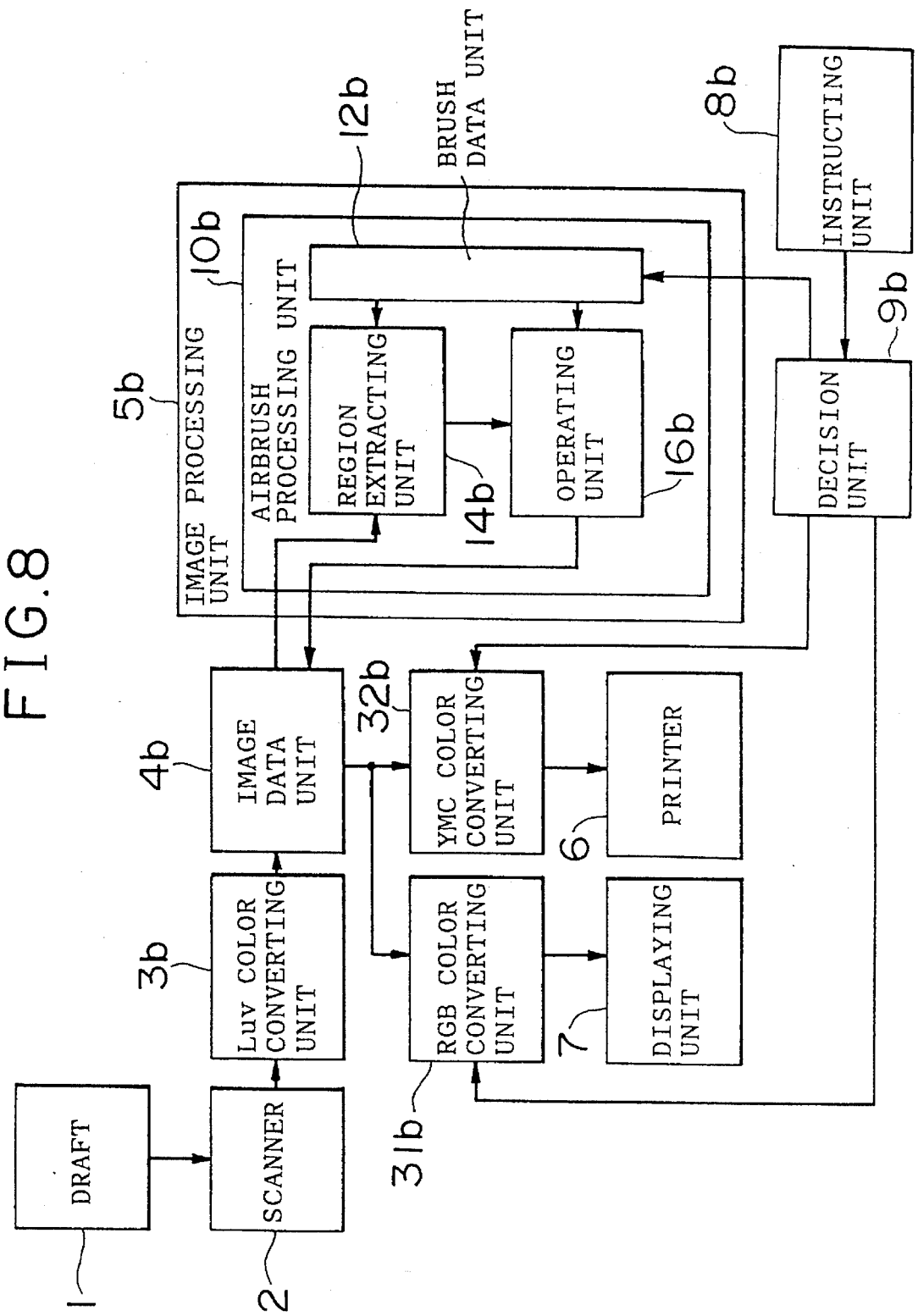
FIG. 8 is a block diagram illustrating the structure of an airbrush device of a second embodiment.

The embodiment 2 of the invention is described below. In the embodiment 2, a L*u*v* coordinate system is used for a color coordinate system. FIG. 8 is a block diagram illustrating the structure of the embodiment 2.

Referring to FIG. 8, a Luv color converting unit 3b is provided between the scanner 2 and a image data unit 4b to convert the RGB data supplied from the scanner 2 into a color space on the image data unit 4b.

In the image data unit 4b, a L*u*v* space is used for its color space. The image data unit 4b is connected with an image processing unit 5b, a RGB color converting unit 31b, and a YMC color converting unit 32b.

The YMC color converting unit 32b converts the image data from the image data unit 4b into CMY data which is suitable for printing by the printer 6. The RGB color converting unit 31b converts the image data from the image data unit 4b into RGB data which is suitable for display on the displaying unit 7.

The image processing unit 5b has a function to execute processing on the image data supplied from the image data unit 4b, and has an airbrush processing unit 10b for performing airbrush operations on the image data from the image data unit 4b. The airbrush processing unit 10b is connected with an instructing unit 8b. The instructing unit 8b serves to give instructions concerning airbrush information in the L*u*v* space. Also a brush data unit 12b, a region extracting unit 14b and an operating unit 16b are provided.

Processing in Embodiment 2

Figure 9:
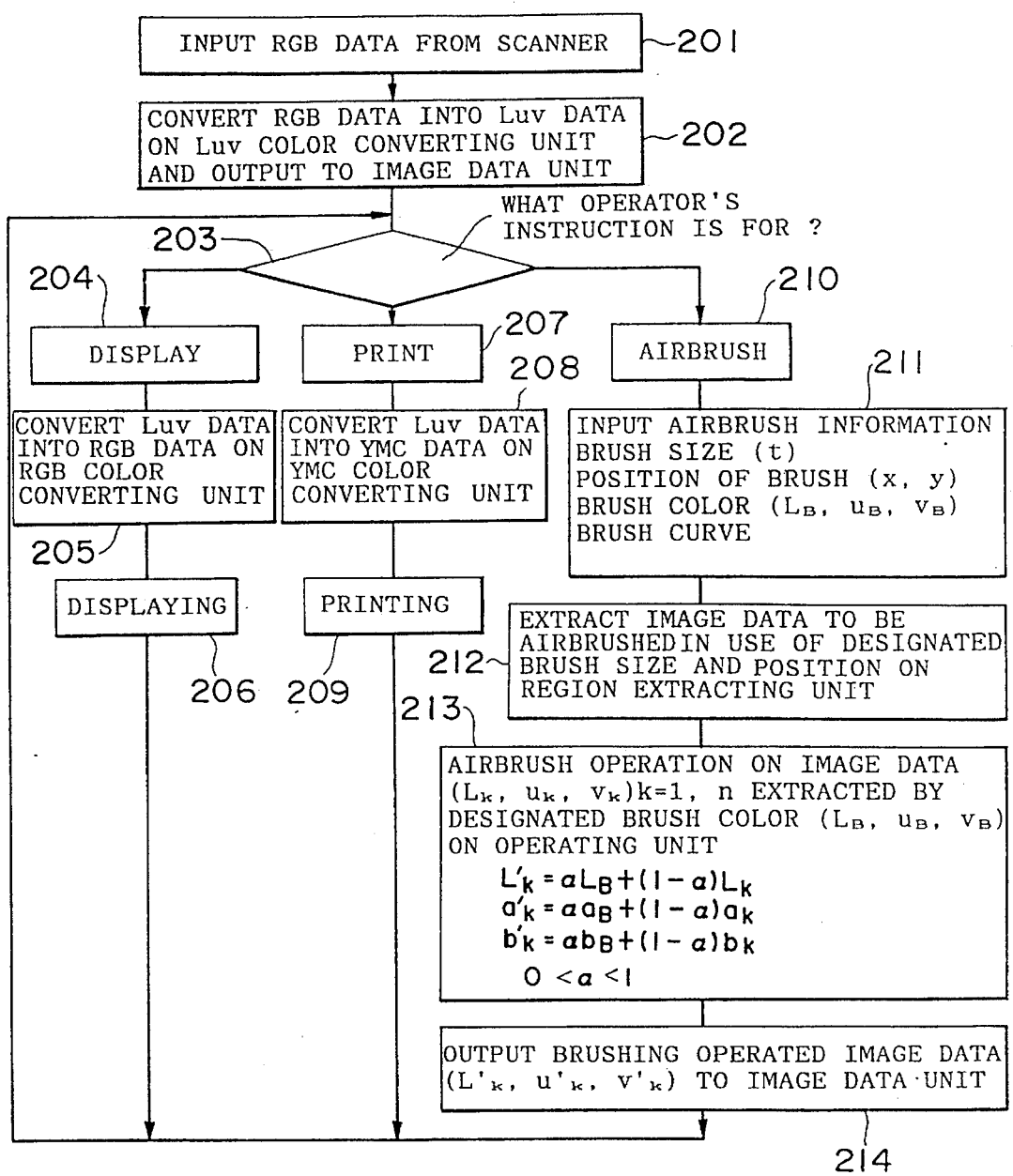
FIG. 9 is a flow chart illustrating the process of a method for airbrushing according to the second embodiment.

The method for airbrushing according to the embodiment 2 is now described in detail below with reference to the flow chart of FIG. 9 which illustrates the method of the embodiment 2.

First, the scanner 2 picks up and analyzes an image of the draft 1 into RGB data (step 201), and the Lab color converting unit 3b converts the RGB data into Luv data by performing coordinate transformation from the RGB system to the L*u*v* system and outputs the converted data to the image data unit 4b (step 202).

Here, the coordinate transformation from the RGB system to the L*u*v* system (as defined in CIE 1976) can be expressed in the following equations.

$L^* = 116(Y/Y_0)^{1/3} - 16$ $(Y/Y_0 > 0.00856)$ $a^* = 13L^*(u' - u_0')$ $b^* = 13L^*(v - v_0')$ $u' = 4X/(X + 15Y + 3Z)$ $v' = 9Y/(X + 15Y + 3Z)$

In the above, the coordinate transformation from the RGB coordinates to the XYZ coordinates is done in the same manner as that of the embodiment 1.

Next, upon receipt of an instruction given by the operator through the instructing unit 8b to perform either one of displaying, printing and airbrushing operations, the determination unit 9b judges and determines the contents of the instruction (step 203).

For example, if the operator gives an instruction through the instructing unit 8b to a display (step 204), the determination unit 9b activates the RGB color converting unit 31b. Then, the L*u*v* data is converted on the RGB color converting unit into the RGB data (step 205), and the converted RGB data is displayed on the displaying unit 7 (step 206).

If the operator gives an instruction through the instructing unit 8b to print (step 207), the determination unit 9b activates the YMC color converting unit 32b. Then, the L*u*v* data is converted on the YMC color converting unit into the YMC data (step 208), and the converted YMC data is printed by the printer 6 (step 209).

Alternatively, the processing from the step 207 to the step 209 can be conducted prior to the processing from the step 204 to the step 206.

Next, an instruction is given by the operator to perform required image processing on the image data displayed on the displaying unit 7. In this embodiment, the airbrushing unit 10b performs an airbrush operation as one of the operations for the image processing in the L*u*v* space (step 210).

The airbrush data unit 12b inputs airbrush information according to the instructions given by the operator through the instructing unit 8b (step 211). This airbrush information is the same with that of the embodiment 1.

Next, the region extracting unit 12b extracts suitable image data corresponding to the information concerning the position and size of brush from the image data which have been stored in the image data unit 4b (step 212).

And, the operation unit 14b performs an operation on the corresponding image data $L_kU_kV_k$ (k=1, n) with the brush % of the brush curve being supplied from the brush data unit 12b and with the designated brush color $(L_BU_BV_B)$, so that airbrushed image data $L_k'U_k'V_k'$ (k=1, n) is calculated by means of the following equations (step 213).

$L_k' = \alpha L_B + (1-\alpha)L_k$ $U_k' = \alpha u_B + (1-\alpha)U_k$ $V_k' = \alpha v_B + (1-\alpha)v_k$ $0 < \alpha < 1$ And, the airbrushed image data $L_k'u_k'v_k'$ is output to the image data unit 4b (step 214). Further, the processed image can be confirmed by means of the displaying unit 7 or the printer 6.

Upon completion of the operation of the step 214, processing returns to the step 203.

In the present invention, the image data and the brush data in the L*u*v* coordinate system make it possible to achieve brushing operations in which only lightness or chroma can be varied which have not been available with RGB data in the prior art.

Embodiment 3

Figure 10:
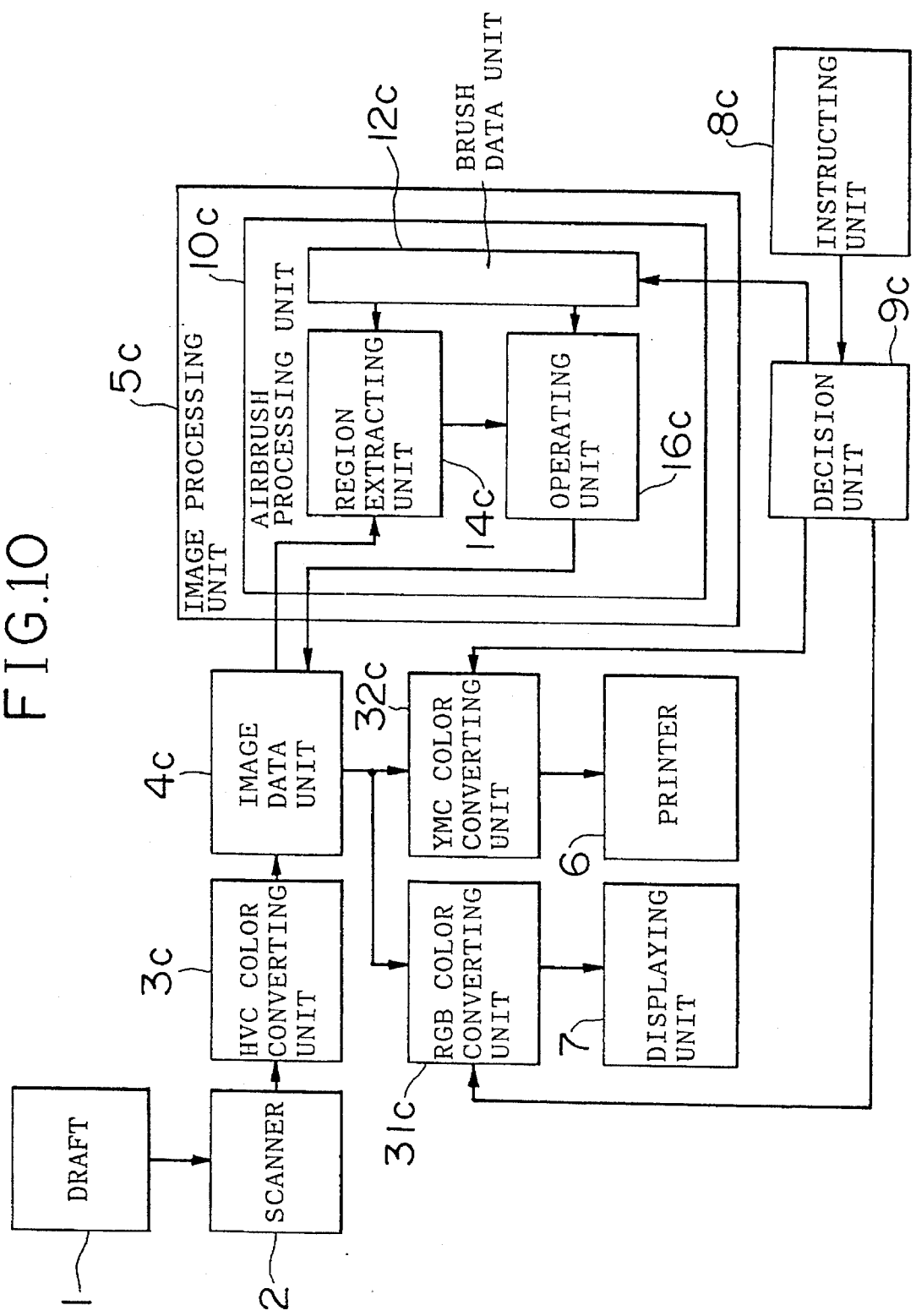
FIG. 10 is a block diagram illustrating the structure of an airbrush device of a third embodiment.

The embodiment 3 of the invention is described below. FIG. 10 is a block diagram illustrating the structure of the embodiment 3. In the embodiment 3, a color coordinate system consisting of HVC (H; hue, V; value, C; chroma) is used.

An HVC color converting unit 3c is provided between the scanner 2 and a image data unit 4c to convert the RGB data supplied from the scanner 2 into a color space on the image data, unit 4c.

In the image data unit 4c, an HVC space is used for its color space. The image data unit 4c is connected with an image processing unit 5c, a RGB color converting unit 31c, and a YMC color converting unit 32c.

The YMC color converting unit 32c converts the image data from the image data unit 4c into CMY data which is suitable for printing by the printer 6. The RGB color converting unit 31b converts the image data from the image data unit 4c into RGB data which is suitable for display on the displaying unit 7.

Further, the image processing unit 5c has an airbrush processing unit 10c. The airbrush processing unit 10c is provided with a brush data unit 12c, a region extracting unit 14c, and an operating unit 16c.

Processing in Embodiment 3

Figure 11:
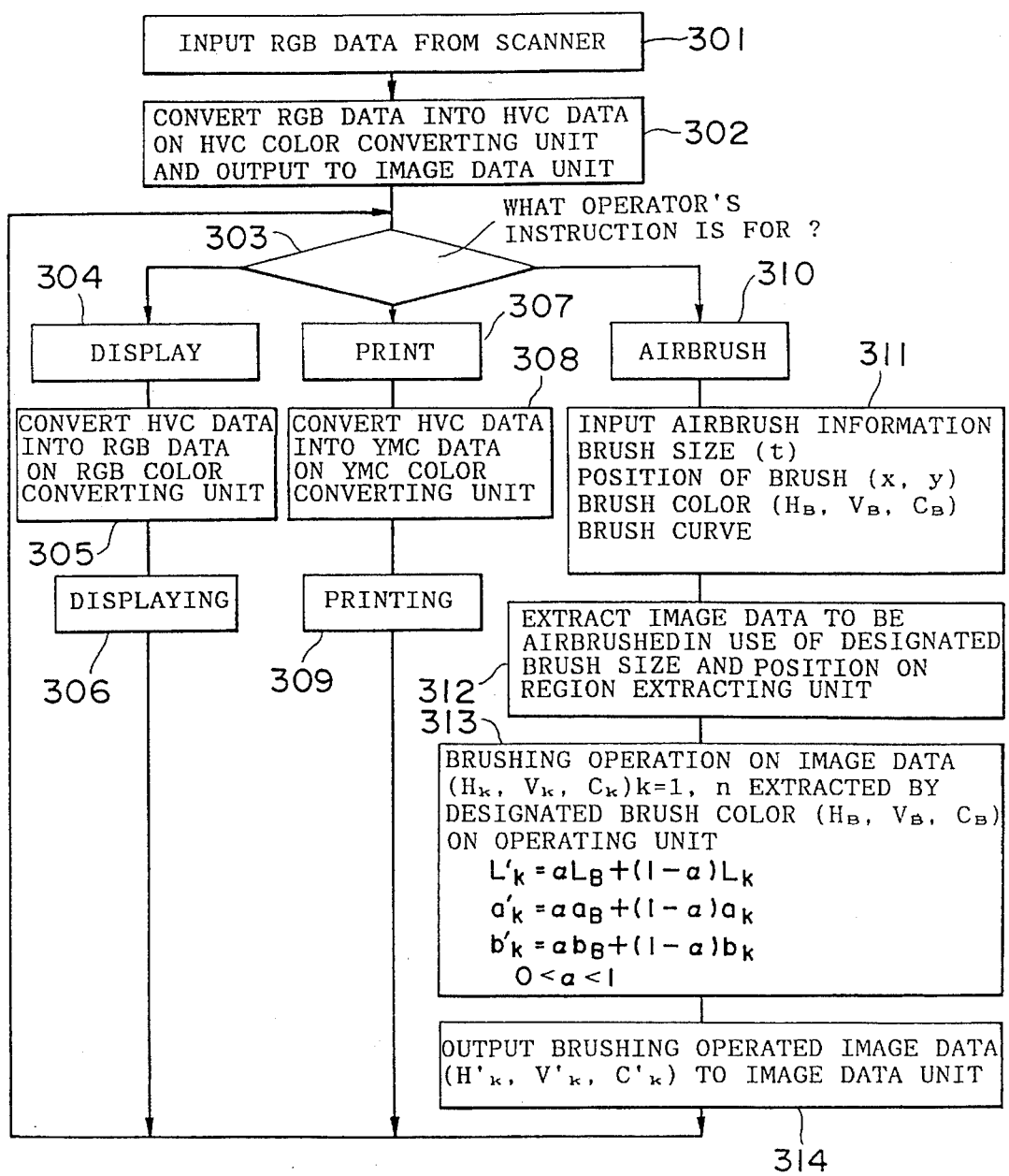
FIG. 11 is a flow chart illustrating the process of a method for airbrushing according to the third embodiment.
Figure 14A:
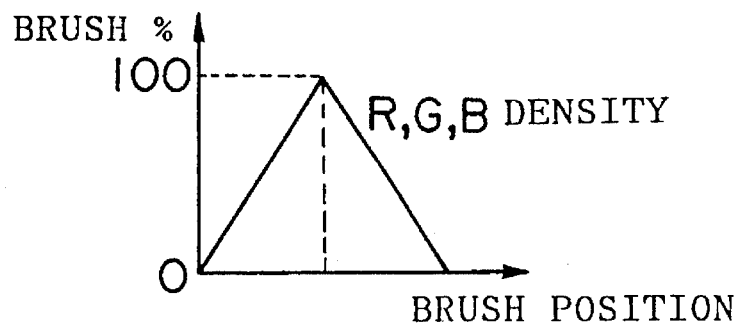
FIGS. 14(a) to 14(c) (PRIOR ART) illustrate brush curves in the conventional RGB space.
Figure 14B:
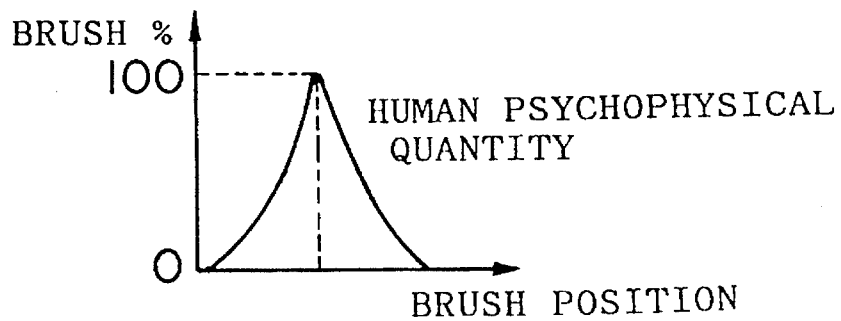
Figure 14C:
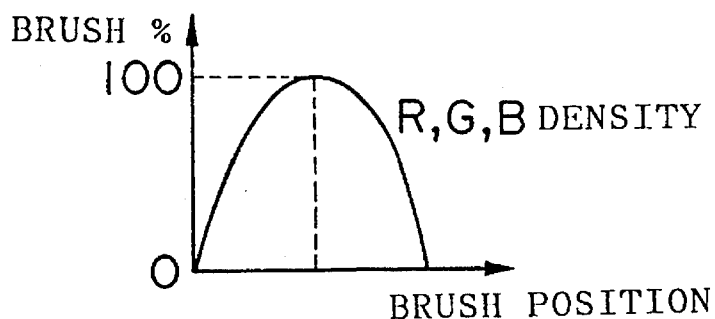

The method for airbrushing according to the embodiment 3 is now described in detail below with reference to the flow chart of FIG. 11 which illustrates the method of the embodiment 3.

First, the scanner 2 picks up and analyzes an image of the draft 1 into RGB data (step 301), and the HVC color converting unit 3c converts the RGB data into HVC data by performing coordinate transformation from the RGB system to the HVC system and outputs the converted data to the image data unit 4c (step 302).

In this embodiment, the coordinate transformation from the RGB system to the HVC system (Munsell coordinates) can be done by means of tables of correspondence as provided by the Japanese Industrial Standard "JIS Z8721".

Next, upon receipt of an instruction given by the operator through the instructing unit 8c to perform either displaying, printing or airbrushing operations, the determination unit 9c judges and determines the contents of the instruction (step 303).

If the operator gives an instruction through the instructing unit 8c to execute a displaying operation (step 304), the determination unit 9c activates the RGB color converting unit 31c. Then, the HVC data is converted on the RGB color converting unit into the RGB data (step 305), and the converted RGB data is displayed on the displaying unit 7 (step 306).

If the operator gives an instruction through the instructing unit 8b to execute a printing operation (step 307), the determination unit 9b activates the YMC color converting unit 32c. Then, the HVC data is converted on the YMC color converting unit into the YMC data (step 308), .and the converted YMC data is output to the printer 6 (step 309).

Alternatively, the processing from the step 307 to the step 309 can be conducted prior to the processing from the step 304 to the step 306.

Next, an instruction is given by the operator to resume the required image processing on the image data displayed on the displaying unit 7. In this embodiment, the airbrush processing unit 10c performs an airbrush operation in the L*u*v* space as one of the image processing (step 310).

The airbrush data unit 12c inputs airbrush information according to instructions given by the operator through the instructing unit 8c (step 311). This airbrush information is the same with the aforesaid airbrush information in connection with the embodiment 1 or embodiment 2.

Next, the region extracting unit 12c extracts suitable image data corresponding to the information concerning position and size of the brush from the image data which has been stored in the image data unit 4c (step 312).

And, the operation unit 14c performs an operation on the corresponding image data $H_k V_k C_k$ (k=1, n) with the brush % of the brush curve being supplied from the brush data unit 12c and with the designated brush color $(H_B V_B C_B)$, so that airbrushed image data $H_k' V_k' C_k'$ (k=1, n) is calculated by means of the following equations (step 313).

$H_k' = \alpha H_B + (1-\alpha) H_k$ $V_k' = \alpha V_B + (1-\alpha) V_k$ $C_k' = \alpha C_B + (1-\alpha) C_k$ $0 < \alpha < 1$ And the airbrushed image data $H_k' V_k' C_k'$ is output to the image data unit 4c (step 314). Further, the processed image can be confirmed by means of the displaying unit 7 or the printer 6.

Upon completion of the operation of the step 314, processing may return to the step 303.

In the present invention, the image data and the brush data in the HVC coordinate system make it possible to carry out brushing operations in which only lightness or chroma can be varied which had not been available with RGB data in the prior art.

Embodiment 4

The embodiment 4 of the invention is described below. In the embodiment 4, masking operations or neural networks are used to perform said coordinate transformation. The masking operation includes calculation of coefficients of transformation from the corresponding data, and in performing the transformation only a matrix operation is required. The neural network includes learning data of correspondence beforehand to perform the transformation.

An example of a second order masking operation for transformation from the RGB coordinate system to the Lab coordinate system is shown below.

$L = A_{11} \cdot R + A_{12} \cdot G + A_{13} \cdot B + A_{14} \cdot RG + A_{15} \cdot RB + A_{16} \cdot BR + A_{17} \cdot R^2 + A_{18} \cdot G^2 + A_{19} \cdot B^2 + A_{110} \cdot 1$ $a = A_{21} \cdot R + A_{22} \cdot G + A_{23} \cdot B + A_{24} \cdot RG + A_{25} \cdot RB + A_{26} \cdot BR + A_{27} \cdot R^2 + A_{28} \cdot G^2 + A_{29} \cdot B^2 + A_{210} \cdot 1$ $b = A_{31} \cdot R + A_{32} \cdot G + A_{33} \cdot B + A_{34} \cdot RG + A_{35} \cdot RB + A_{36} \cdot BR + A_{37} \cdot R^2 + A_{38} \cdot G^2 + A_{39} \cdot B^2 + A_{310} \cdot 1$ One method for conducting the above learning in the neural network and the determination of coefficients for the masking operation is to calculate the corresponding values by observing colors of a plurality of color chips. An example of the learning and the determination of masking coefficients in the color conversion between the RGB data and the Lab data is shown in FIG. 12.

First, observing colors of the color chips 22 as color samples for the entire range is done by the colorimeter 24 to obtain Lab data for each color chip, while the scanner 2 picks up images of the same color chips to obtain its RGB data. Hence data of correspondence between the Lab data and the RGB data is created.

Next, the masking coefficients can be calculated by learning the RGB data and the Lab data with a learning coefficient calculating unit 26 or by using the method of least squares.

It is to be understood from the above descriptions of the preferred embodiments that, according to the present invention, application of the lightness-chroma-hue coordinate system to the image data and the brush data in performing the airbrush operations can dissolve the defects of unnatural effects found in the conventional airbrush being processed in the RGB or YMC space.

Also, according to the invention, use of the image data in the lightness, chroma and/or hue coordinate system makes it possible to perform airbrush operations with different lightness, chroma or hue from the original, image data on the basis of the airbrush information consisting of lightness, chroma and hue, thereby making the image processing more effective.

What is claimed is:

1. A method for airbrushing in order to gradate a designated region or regions of RGB data, comprising the steps of:
    converting said RGB data in a RGB coordinate system into image data in a lightness, chroma and/or hue coordinate system;
    designating airbrush information for performing an airbrush operation on the converted image data in the lightness, chroma and/or hue coordinate system;
    extracting image data corresponding to said airbrush information from the converted image data in the lightness, chroma and/or hue coordinate system; and
    performing an airbrush operation on the extracted image data in the lightness, chroma and/or hue coordinate system based on said airbrush information.

2. The method for airbrushing as stated in claim 1, wherein said conversion step comprises converting said RGB data into image data in a Lab coordinate system consisting of L representing lightness and ab representing chroma and hue.

3. The method for airbrushing as stated in claim 1, wherein said conversion step comprises converting said RGB data into image data in a Luv coordinate system consisting of L representing lightness and uv representing chroma and hue.

4. The method for airbrushing as stated in claim 1, wherein said conversion step comprises converting said RGB data into image data in a HVC coordinate system consisting of hue H, lightness V, and chroma C.

5. The method for airbrushing as stated in claim 1, wherein said conversion step includes the steps of picking up images of color chips to obtain RGB data, observing colors of the color chips to obtain image data in the lightness, chroma and/or hue coordinate system, and learning data of correspondence between said RGB data and the image data in the lightness, chroma and/or hue coordinate system, to perform said conversion.

6. The method for airbrushing as stated in claim 1, wherein said designation step comprises designating airbrush information including airbrush size and position of airbrushing, brush colors and brush curves.

7. The method for airbrushing as stated in claim 6, wherein said extraction step comprises extracting the image data in the lightness, chroma and/or hue coordinate system corresponding to the airbrush information concerning airbrush size and position of airbrushing from said image data in the lightness, chroma and/or hue coordinate system.

8. The method for airbrushing as stated in claim 7, wherein said processing step comprises performing an operation on said extracted image data in the lightness, chroma and/or hue coordinate system with the airbrush information concerning brush color and brush curve to obtain brushed image data.

9. The method for airbrushing as stated in claim 1, further including the steps of converting said data in the lightness, chroma and/or hue coordinate system into RGB data, and displaying the converted RGB data on a displaying unit.

10. The method for airbrushing as stated in claim 1, further including the steps of converting said data in the lightness, chroma and/or hue coordinate system into cyan-magenta-yellow data, and printing the converted cyan-magenta-yellow data by a printer.

11. An airbrush device for performing an airbrush operation in order to gradate a designated region or regions of RGB data, comprising:
    a converting means to convert said RGB data in a RGB coordinate system into image data in a lightness, chroma and/or hue coordinate system;
    a designating means to designate airbrush information for performing an airbrush operation on the image data in the lightness, chroma and/or hue coordinate system converted by said converting means;
    an extracting means to extract image data corresponding to said airbrush information from the image data in the lightness, chroma and/or hue coordinate system converted by said converting means; and
    a processing means to perform an airbrush operation on the image data in the lightness, chroma and/or hue coordinate system extracted by said extracting means based on the airbrush information.

12. The airbrush device as stated in claim 11, wherein said converting means comprises a Lab color converting unit to convert said RGB data into image data in a Lab coordinate system consisting of L representing lightness and ab representing chroma and hue.

13. The airbrush device as stated in claim 11, wherein said converting means comprises a Luv color converting unit to convert said RGB data into image data in a Luv coordinate system consisting of L representing lightness and uv representing chroma and hue.

14. The airbrush device as stated in claim 11, wherein said converting means comprises a HVC color converting unit to convert said RGB data into image data in a HVC coordinate system consisting of hue H, lightness V, and chroma C.

15. The airbrush device as stated in claim 11, wherein said converting means comprises a pick up means to pick up images of color chips to obtain RGB data, a colorimeter to observe colors of the color chips to obtain image data in the lightness, chroma and/or hue coordinate system, and a learning means to perform said transformation by learning data of correspondence between said RGB data and the image data in the lightness, chroma and/or hue coordinate system.

16. The airbrush device as stated in claim 11, wherein said designating means has a function to designate airbrush information including airbrush size and position of airbrushing, brush colors and brush curves.

17. The airbrush device as stated in claim 16, wherein said extracting means has a function to extract the image data in the lightness, chroma and/or hue coordinate system corresponding to the airbrush information concerning airbrush size and position of airbrushing from said image data in the lightness, chroma and/or hue coordinate system.

18. The airbrush device as stated in claim 17, wherein said processing means has a function to perform an operation on said image data in the lightness, chroma and/or hue coordinate system extracted by said extracting unit with the airbrush information concerning brush color and brush curve to obtain brushed image data.

19. The airbrush device as stated in claim 11, further comprising a color converting unit to convert said data in the lightness, chroma and/or hue coordinate system into RGB data, and a displaying unit to display the RGB data converted by said color converting unit.

20. The airbrush device as stated in claim 11, further comprising a color converting unit to convert said data in the lightness, chroma and/or hue coordinate system into cyan-magenta-yellow data, and a printer to print the converted cyan-magenta-yellow data by said color converting unit.

* * * * *

UNITED STATES PATENT AND TRADEMARK OFFICE
CERTIFICATE OF CORRECTION

PATENT NO. : 5,506,603
DATED : April 9, 1996
INVENTOR(S) : Michiko KAWANO, et al.

It is certified that error appears in the above-indentified patent and that said Letters Patent is hereby corrected as shown below:

Column 5, line 48, after "118" delete "," and insert --.--.

Signed and Sealed this

Sixth Day of August, 1996

Attest:

BRUCE LEHMAN

*Attesting Officer*  *Commissioner of Patents and Trademarks*